114-253. XR 3,136,529 SR

CROSS REFERENCE SEARCH ROOM

Ty 3362
X 2351

June 9, 1964 F. R. DICKINSON ET AL 3,136,529

METHOD AND APPARATUS FOR LAUNCHING REPEATERS OF UNDERWATER COMMUNICATION CABLE

Filed Sept. 21, 1962 5 Sheets-Sheet 1

INVENTORS F. R. DICKINSON
G. A. TUCHEN
BY
B. Stoddard
ATTORNEY

INVENTORS F. R. DICKINSON
G. A. TUCHEN
BY
B. S. Stoddard
ATTORNEY

INVENTORS F. R. DICKINSON
G. A. TUCHEN
BY B. J. Stoddard
ATTORNEY

INVENTORS F. R. DICKINSON
G. A. TUCHEN
BY
[signature]
ATTORNEY

INVENTORS F. R. DICKINSON
G. A. TUCHEN
BY
B. F. Stoddard
ATTORNEY

United States Patent Office 3,136,529

Patented June 9, 1964

3,136,529

METHOD AND APPARATUS FOR LAUNCHING REPEATERS OF UNDERWATER COMMUNICATION CABLE

Frank R. Dickinson, Glen Ridge, and Gerd A. Tuchen, Bridgewater Township, Somerset County, N.J., assignors to Bell Telephone Laboratories, Incorporated, New York, N.Y., a corporation of New York Filed Sept. 21, 1962, Ser. No. 225,228
13 Claims. (Cl. 254—134.3)

This invention relates to a method and apparatus for launching repeaters connected at intervals in an ocean communication cable and, more particularly, to a method and apparatus for conveying a repeater from the deck of a cable-laying ship to the ocean floor at the same rate of descent as an equivalent length of the cable in which it is connected. The invention is especially useful when it is applied to the process of launching repeaters in ocean communication cable of the armorless type.

As is well known in the art, underwater communication cable, which is also known as ocean cable, is usually provided with many enlargements or lumps which are connected integrally therein at spaced intervals along its length by any convenient method, such as by splicing. The spacing between the lumps varies with the particular type of cable and may be fifty miles in some cases and ten miles in other instances. The lumps are constituted by instrumentality housing structures which contain electronic instrumentalities forming such equipment as repeaters or equalizers. These lump-type housing structures are usually several feet in length and their diameter is generally considerably greater than the diameter of the cable. Each of these instrumentality housings ordinarily weighs several hundred pounds. For the purpose of convenience in the following description, these lump-type instrumentality housing structures will be referred to simply as repeaters. This should not be interpreted as limiting the application of the invention to only repeaters because the invention is equally applicable to housing structures which contain equalizers or other useful instrumentalities.

When an ocean communication cable is being laid, considerable care is usually exercised during the cable-laying process to insure that a desired degree of slack in the cable is maintained to enable the cable to conform properly to irregularities, particularly depressions, in the contour of the ocean floor. The reason for this is that, when the cable is laid in this manner, it is less apt to be caught by trawling gear operated by fishing boats.

Formerly, most ocean communication cable was of the armored type having a heavy external protective sheath or armor comprising, for example, a multiplicity of spirally wrapped layers of steel wire. The substantial weight of this armor caused the cable to sink rapidly after it had been payed out from a cable-laying ship into the ocean. By properly correlating the pay-out rate with the speed of the ship, the desired degree of slack could be obtained.

Recently developed ocean communication cable differs from the cable described above in that its outer protective covering is formed of a suitable plastic material, such as polyethylene. Consequently, this new type of cable is known as armorless cable. Due to this construction, this type of cable is considerably lighter in weight than armored cable and tends to sink much more slowly when it is payed out into the ocean. However, the repeaters connected into an armorless cable are relatively heavy and, for this reason, the slow sinking rate of the cable creates a problem in maintaining the desired degree of slack in cable that is being laid.

This problem arises from the fact that, since the weight of a repeater is heavy in comparison with the weight of the armorless cable, a repeater will sink much more rapidly than the cable. For example, tests made with one type of cable and repeater showed that the repeater sank at a rate that was eight times faster than the sinking rate of the cable. This faster descent causes a repeater to pull toward it a portion of the adjoining slack cable that has just been payed out. Consequently, this section of the cable will not conform to the contour of the ocean floor because it will be pulled up out of depressions and will be stretched taut above them thereby becoming susceptible to being caught by trawling gear operated by fishing boats. Furthermore, the rapid descent of a repeater would produce a severe impact when the repeater struck the ocean floor and the shock resulting from this impact might damage the electronic components in the repeater.

Accordingly, an object of this invention is to provide improved means for maintaining a desired degree of slack in a cable that is being laid.

Another object of this invention is to provide improved means for conveying a repeater from a ship to the ocean floor at the same rate of descent as a communication cable to which it is connected.

A further object of the invention is to provide an improved method and means for conveying a heavy repeater to the ocean floor without producing an appreciable impact when the repeater arrives at the ocean floor.

An additional object of this invention is to provide an improved method and means for conveying and connecting a repeater to a flotage device without interrupting the continuity of the cable-laying process and without reducing the pay-out speed.

These and other objects of the invention are attained by providing a flotage device for each repeater. Each flotage device functions as a buoyant counterpoise for its associated repeater and is so designed as to cause a repeater to sink at the same rate as an equivalent length of cable. Since a preferred type of counterpoise has considerable bulk, such as three feet by three feet by seven feet, it should be overboarded before its associated repeater is payed out so as not to interrupt the continuity of the paying-out process which, for example, may have a pay-out rate of eight knots. After the counterpoise has been overboarded, it is towed behind the ship by a line which also functions as a trolley line during the launching of a repeater. This line is coupled to the counterpoise by means of a double-action latch.

Shortly before a repeater is to be launched, it is automatically enclosed within a bridle having openings at each end to permit the cable to extend therethrough. This bridle is coupled by a corrosion link to a ring which encircles the trolley line. Thus, when the repeater is overboarded, the ring slides down the trolley line thereby guiding the repeater to the floating counterpoise. The impact of the ring against the double-action latch operates it and causes it to hold the ring and to release the trolley line. The repeater is thus coupled to the counterpoise and they now sink slowly to the ocean floor at the desired rate of descent. The corrosion link subsequently disintegrates thereby uncoupling the counterpoise from the repeater.

These and other features of the invention are more fully discussed in connection with the following detailed description of the drawing in which.

Figure 1:
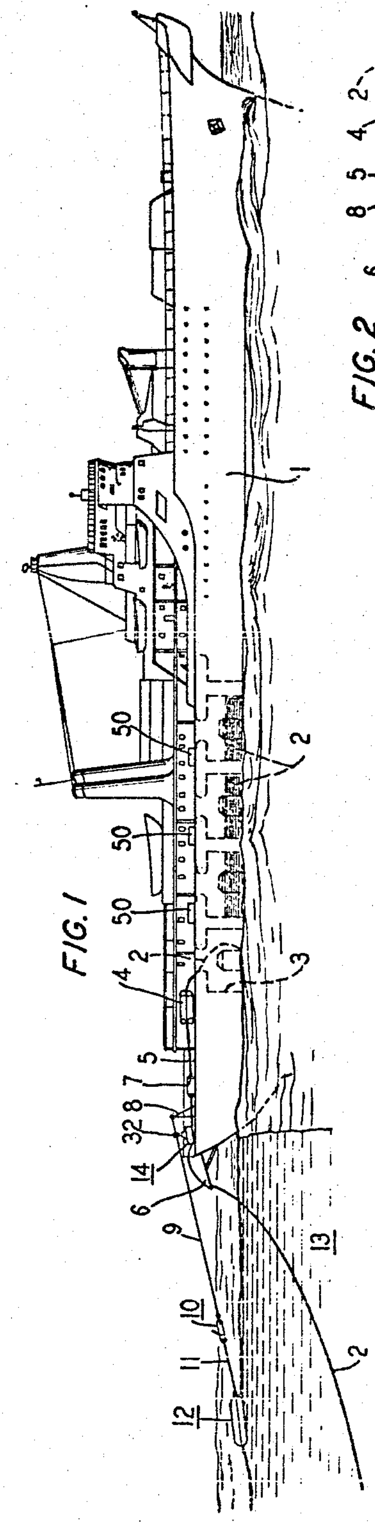
FIG. 1 is a pictorial representation of a cable-laying ship towing a flotage device.

In FIG. 1, a cable-laying ship 1 is represented as carrying a supply of ocean communication cable 2 coiled in stowage tanks 3 located in the ship's hold. The cable 2 is pulled out of the tanks 3 by a cable-handling engine 4 mounted on a deck 5 of the ship 1. After travelling through the engine 4, the cable 2 slides down an overboarding chute 6 at the stern of the ship 1 and passes into the ocean 13. The engine 4 may be of any suitable type known to those skilled in the art, and for purposes of illustration, is represented as being a caterpillar cable handling engine having upper and lower conveyor tracks between which the cable 2 is gripped. Thus, the engine 4 functions to control the pay-out speed or movement of the cable 2.

FIG. 1 also shows a repeater 7 which is represented as being on the deck 5 of the ship 1 in the process of being launched or overboarded. The other repeaters 7 that are connected into the cable 2 are kept in several stowage racks 50 located on the deck 5 near the cable stowage tanks 3 in a manner like that disclosed in Patent 3,038,648 issued June 12, 1962 to P. E. Kingston. The racks 50 may be of any suitable type designed to hold the repeaters 7 and to restrain them from shifting their positions. As is explained in the Kingston patent, a number of cable bights are brought up from the tanks 3 and are connected to the repeaters 7 by any convenient method, such as by splicing.

When the time approaches for a repeater 7 to be launched, it is taken out of its rack 50 and is placed in a trough that is similar to the trough disclosed in the Kingston patent. This trough extends along the deck 5 from the racks 50 to the cable-handling engine 4 and serves to guide both the cable 2 and the repeaters 7 to the engine 4 in the manner described in the Kingston patent. Thus, each repeater 7 passes through the engine 4 along with the cable 2 in one continuous process without any reduction in the pay-out speed which, as was stated above, is approximately eight knots.

Figure 6:
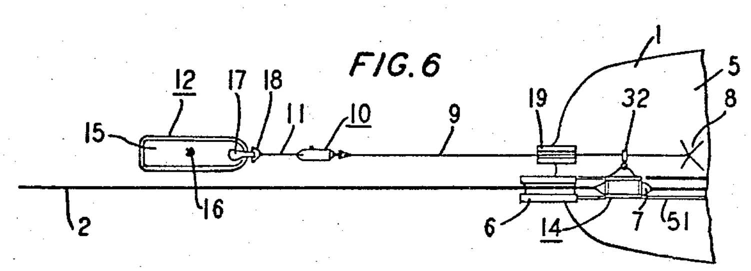
FIG. 6 is a schematic plan view of the stern of the cable-laying ship and illustrates the parallel disposition of the flotage device and its tow line with respect to the cable.
Figure 10:
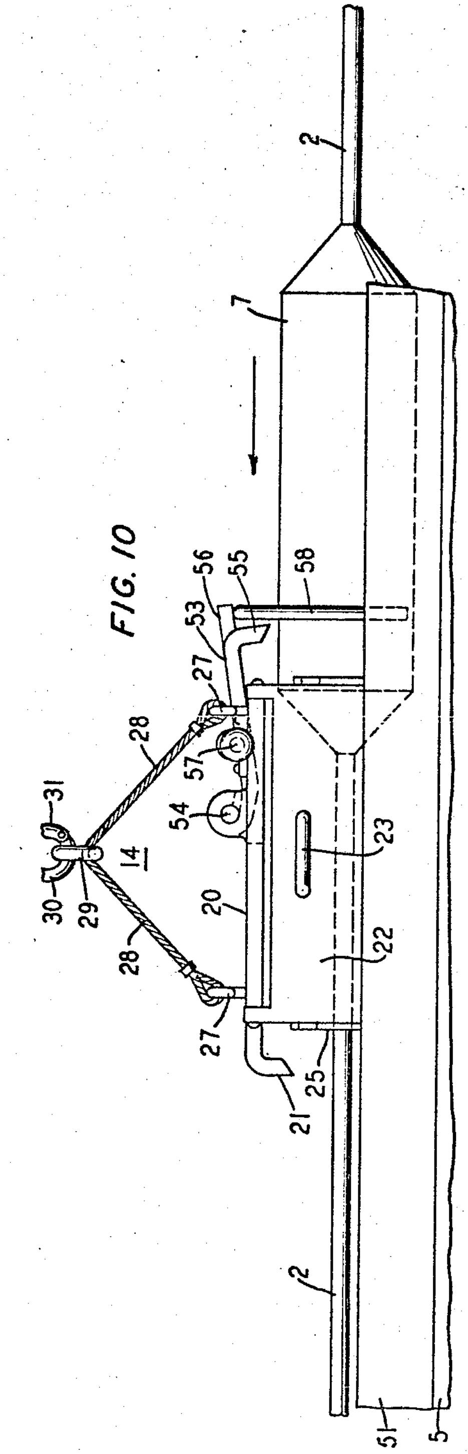
FIG. 10 is a side elevation of a cable trough and a bridle having its right end raised for permitting the entrance of a repeater.
Figure 11:
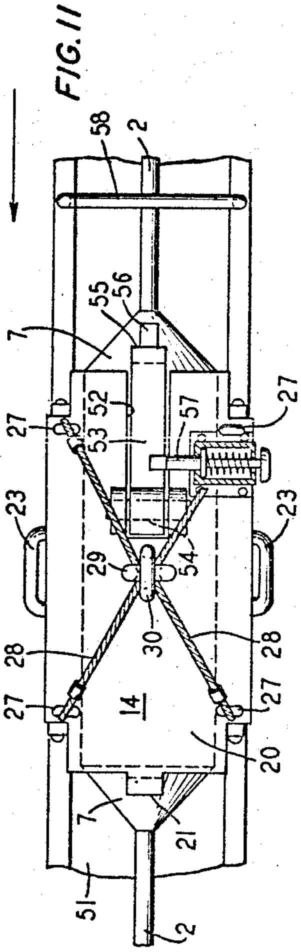
FIG. 11 is a plan view of the cable trough and a bridle with a repeater held therein.

A similar trough 51, shown in FIG. 6, is located on the deck 5 between the engine 4 and the overboarding chute 6 for guiding the cable 2 and the repeaters 7 after they leave the engine 4. Since the first trough leads to the entrance to the engine 4 while the second trough 51 begins at the output from the engine 4, the former is called the approach trough and the latter is termed the exit trough. Near this exit trough 51, a support 8 of any suitable type such as a tripod, is fastened to the deck 5. As is indicated in FIG. 1, the support 8 holds one end of a tow line 9 which is securely attached thereto in any convenient manner. This tow line 9 is made of an appropriate strong material, such as steel. The other end of the tow line 9 is detachably held by one end of a coupling device 10. The coupler 10 has its other end fastened to a shock line 11 which is secured to a flotage device 12 floating on the surface of the body of water 13. The shock line 11 is made of a suitable resilient material, such as nylon, for a purpose that is explained hereinafter. It should be noted that a bridle 14 is slidably connected to the upper end of the tow line 9 and is represented in FIGS. 6, 10 and 11 as normally being placed in the trough 51.

Figure 5:
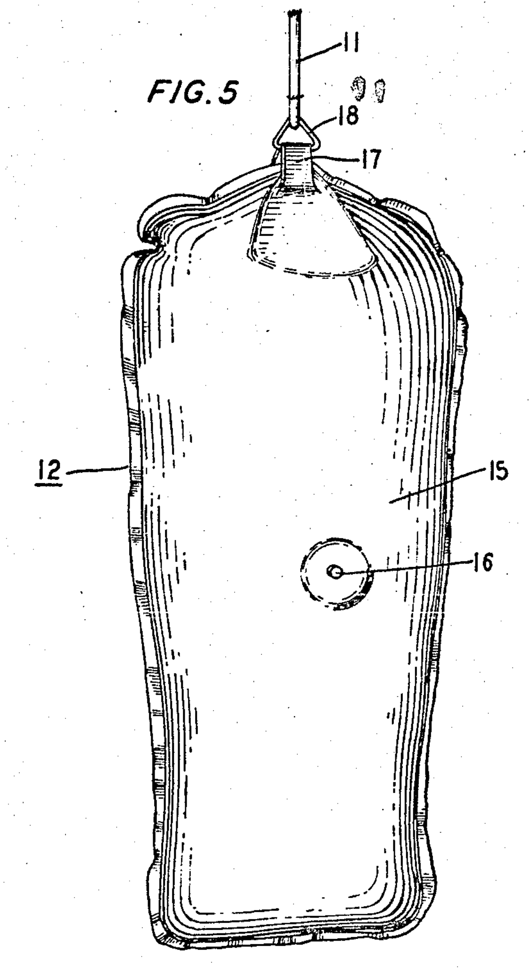
FIG. 5 is a perspective view of the flotage device.
Figures 12, 13, 14:
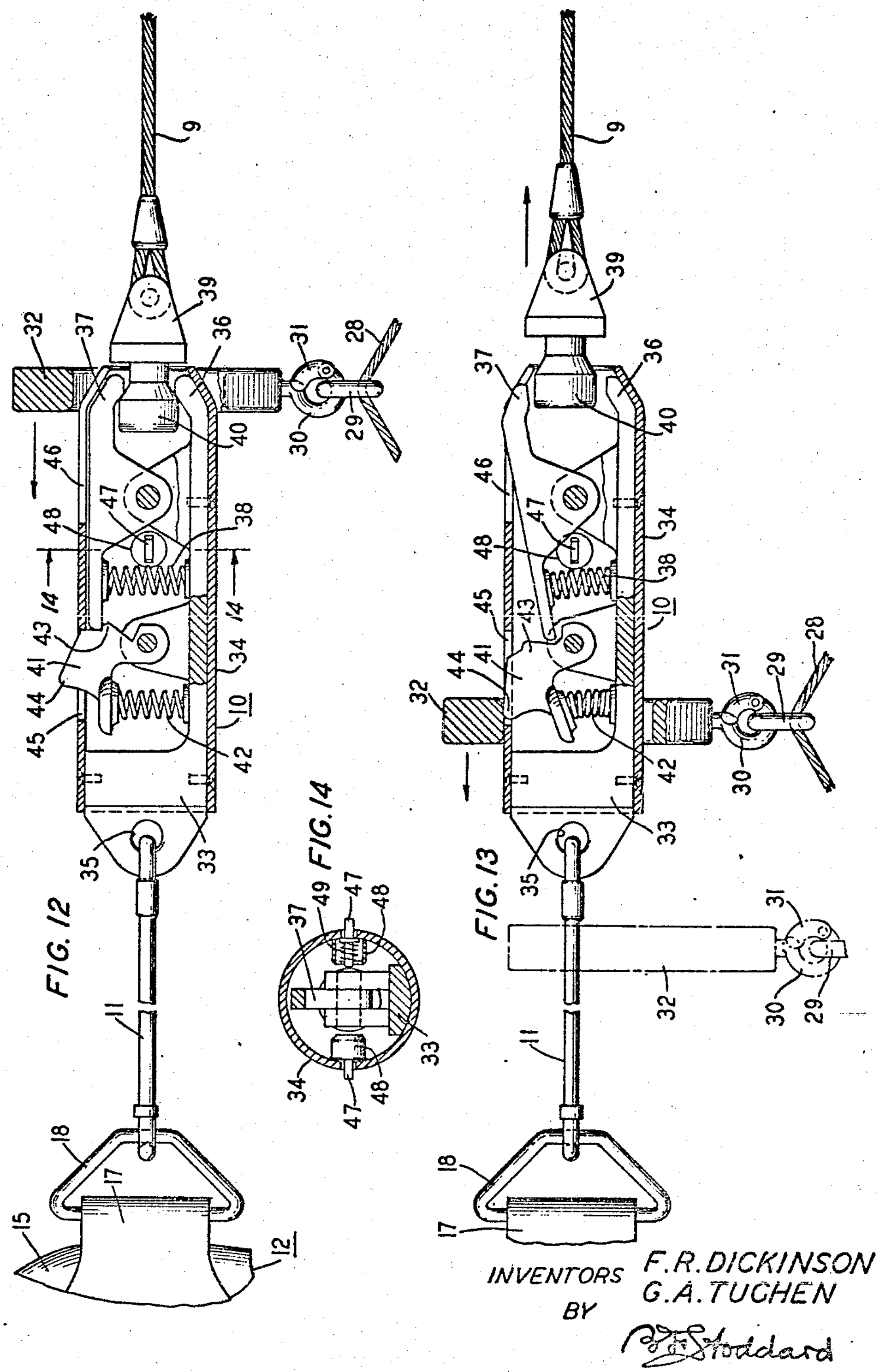
FIG. 12 is a sectional side view of the coupling mechanism for detachably connecting the flotage device to its tow line and also shows the approach of the ring clip that is attached to the bridle.
FIG. 13 is a similar sectional side view in which the coupling mechanism is represented as being actuated by the ring clip for the purpose of disconnecting the tow line and for connecting the bridle to the flotage device.
FIG. 14 is a sectional end view of the coupler taken along the line 14—14 in FIG. 12 and showing, in particular, the safety latch mechanism.

Since the flotage device 12 is designed to function as a buoyant counterpoise for the repeater 7, as was stated above, it must necessarily be of appreciable size because one type of repeater 7 has a weight of about 400 pounds. One satisfactory form of flotage device comprises a rubber fabric bag 15 as is shown in FIG. 5. This bag 15 is about three feet by three feet by seven feet and is provided with a suitable valve 16 so that it can be filled with about 260 gallons of diesel fuel weighing approximately 1,800 pounds. The top portion of the bag 15 is provided with a suitable flap 17 for holding a handle 18 to which one end of the shock line 11 is securely fastened as is best shown in FIG. 12. A separate flotage device 12 is used for each repeater 7.

Due to the weight and bulk of the flotage devices 12, they should each be overboarded at a point in time that is appreciably ahead of the time for overboarding their associated repeaters 7. Accordingly, as is shown in FIG. 6, a bag chute 19 is mounted on the deck 5 at the stern of the ship 1 and near the cable chute 6. It should be noted that the bag chute 19 is positioned off to one side of the cable chute 6 so that, when a bag 15 is in the water it will not be directly over the cable 2. In other words, a flotage device 12 with its shock line 11 and tow line 9 should be so disposed as to be substantially parallel to the overboarded portion of the cable 2. They should be spaced apart a sufficient distance to prevent sideward gyrations of the bag 15 from fouling the cable 2.

Figure 7:
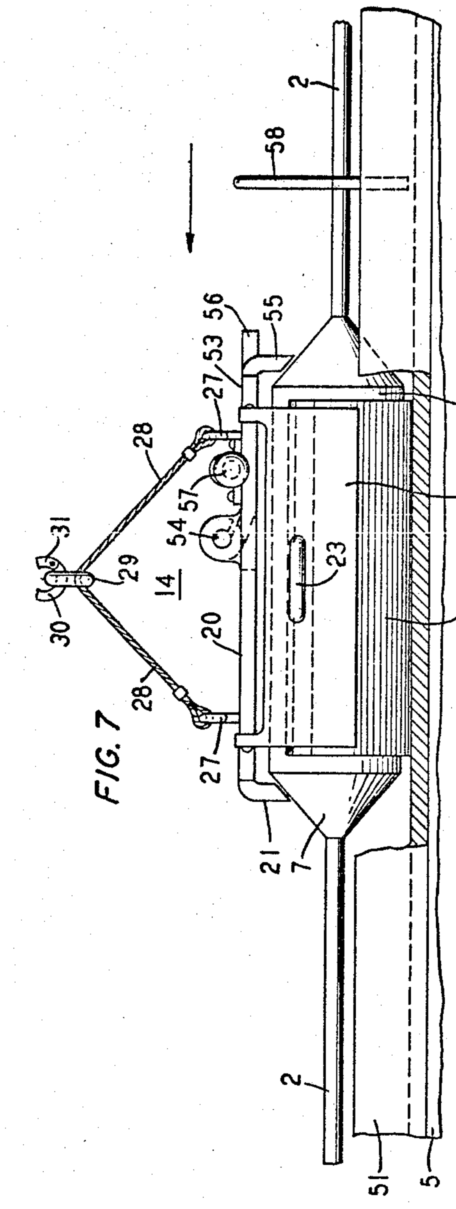
FIG. 7 is a side view of portions of the cable with a repeater held by a bridle.
Figure 9:
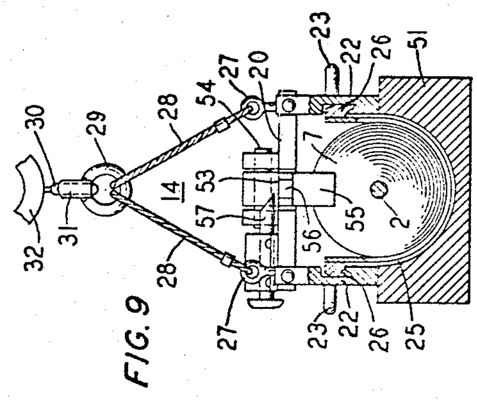
FIG. 9 is an end view of a closed bridle with a repeater retained therein.

In order to assist in guiding a repeater 7 to its flotage device 12, a separate bridle 14 is employed for holding each repeater 7 as is best shown in FIGS. 7 and 9. Each of the bridles 14 is essentially a metallic framework structure for enclosing and retaining a repeater 7 while permitting the adjacent portions of the cable 2 to be unconfined. Each bridle 14 comprises a top plate 20 which is provided at its left end with a downwardly extending end portion 21. The right portion of the top plate 20 has a slot 52 cut therein, as is represented in FIG. 11, for receiving a movable arm 53. The left end of the arm 53 is attached to the top plate 20 by a hinge or pivot 54. The right end of the arm 53 is formed with a downwardly extending end portion 55 and also has an outwardly extending portion 56. A spring-action bolt 57 is mounted on the top plate 20 near one side of the arm 53 for a purpose that is explained hereinafter.

Figure 8:
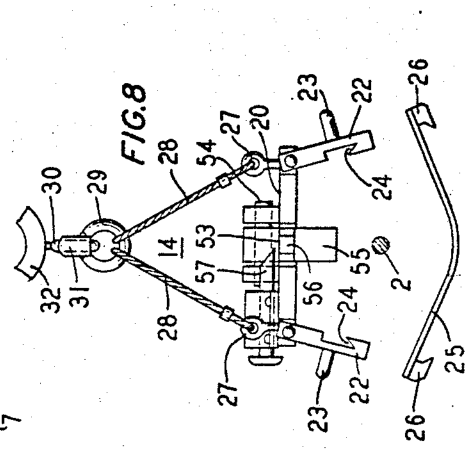
FIG. 8 is an end view of the cable with an opened bridle placed around it.

Two side plates 22, each having a handle 23, are pivotally attached to the top plate 20, one along each side thereof. The interior surface of each side plate 22 has a transverse groove or notch 24 formed therein as is best shown in FIG. 8. Each bridle 14 further includes a flexible bottom plate 25 having downwardly extending flanges 26 along its side edges as is best seen in FIG. 8. The flanges 26 have a cross-sectional shape which is such as to permit them to mate with the notches 24 as is illustrated in FIG. 9.

At a suitable point in time in advance of the time for overboarding a repeater 7, a bridle 14 is placed near the trough 51 and the flanges 26 of the bottom plate 25 are disengaged from the notches 24 in the side plates 22 so as to detach the bottom plate 25. The next step is to encircle the moving cable 2 with the bridle 14. This is accomplished by sliding the bottom plate 25 under the cable 2 and by placing the top plate 20 and the side plates 22 over the cable 2 as is represented in FIG. 8. The sides of the bottom plate 25 are then pushed up to enable the flanges 26 to be inserted into the grooves or notches 24 in the side plates 22 where they fit securely as is indicated in FIG. 9. It should be noted that the bottom edges of the side plates 22 extend downward a distance that is sufficient to rest on the top edges of the trough 51 so as to maintain the bridle 14 in an upright position.

The hinged arm 53 is now maintained in a raised position by means of a supporting member 58. This member 58 is of any suitable construction, such as a metallic rod bent into a U-shape. The ends of the member 58 are inserted into appropriate holes in the top edges of the trough 51. Thus, the middle portion of the member 58 supports the outwardly extending portion 56 of the arm 53 in a raised position as is indicated in FIG. 10.

At the time when the arm 53 was raised, the bolt 57 was manually pulled back against the force of its spring so as to permit the upward movement of the arm 53. After the arm 53 has been raised to its position shown in FIG. 10, the bolt 57 is released but its spring cannot now push it out to the fullest extent because this movement is blocked by the edge of the arm 53. In other words, the end of the bolt 57 will now abut against the edge of the arm 53.

In order to connect the bridle 14 to the tow line 9, the top plate 20 is provided with four eye-bolts 27 vertically mounted near its corners. Two ropes 28, which may be made of steel, are fastened to the eye-bolts 27 in such a manner that one rope 28 connects the two eye-bolts 27 which are mounted along one side of the top plate 20 while the other rope 28 connects the other pair of eye-bolts 27 that are positioned along the opposite side of the top plate 20. Both of these ropes 28 are passed through an annular member 29 which functions as a corrosion link.

The corrosion link 29 is designed to disintegrate after it has been immersed for a time in sea water. It may be made of any suitable material, such as magnesium alloyed with small percentages of aluminum, zinc, and manganese. Part of this alloy is covered with an appropriate insulating material which, in turn, is provided with a suitable covering of silver chloride. The magnesium alloy functions as an anode, the silver chloride as a cathode, and the sea water as an electrolyte. This combination acts as a galvanic cell to produce anodic corrosion which eventually causes the link 29 to disintegrate.

The corrosion link 29 is held by a ring clip 30 having a hinged portion 31 as is best seen, for example, in FIG. 12. The hinged portion 31 can be opened to permit the corrosion link 29 to be hooked therein after which the hinged portion 31 is closed. The hinged portion 31 is tightly held in its closed position by friction or by other suitable means, such as a locking pin. The ring clip 30 is securely attached to another annular member 32 which is shown in FIGS. 12 and 13. This annular member 32 functions as a slide ring for sliding on the tow line 11 as is explained hereinafter.

It was stated above that the tow line 9 is connected to the shock line 11 by a coupling device 10 which functions as a double action latch. This coupling device 10, which is shown in detail in FIGS. 12 and 13, is substantially cylindrical with tapered ends. It should be noted that the external diameter of the coupler 10 is slightly less than the internal diameter of the slide ring 32 so that the ring 32 can freely slide over it as is indicated in FIGS. 12 and 13.

The coupler 10 comprises a body member 33 enclosed within a shield 34. One end of the body member 33 has an eye 35 formed therein for receiving one end of the shock line 11 which is securely fastened thereto. The other end of the body member 33 is so fashioned as to provide a fixed jaw 36 and a support for a movable jaw 37 which is pivotally secured thereto. A compression spring 38 is mounted on the body member 33 and normally forces the left end of the movable jaw 37 upward toward the shield 34 thereby forcing the right end of the jaw 37 downward toward the lower jaw 36.

The jaws 36 and 37 serve to detachably hold a connector 39 which has one end of the tow line 9 securely fastened thereto by means of a tapered splice. The connector 39 is provided with a knob 40 which is adapted to be held between the jaws 36 and 37, as is shown in FIG. 12. Since the spring 38 normally forces the upper jaw 37 toward the lower jaw 36, this force functions to retain the knob 40. Thus, the tow line 9 is detachably held by the coupler 10.

The body member 33 also provides a support on which a latch 41 is pivotally mounted. A second compression spring 42, mounted on the body member 33, normally forces the left end of the latch 41 upward. The right end of the latch 41 is formed with a tip 43 which fits under the left end of the upper jaw 37. This serves to hold the upper jaw 37 in the position shown in FIG. 12. In other words, the latch 41 normally locks the jaw 37 in its closed position so that it will securely hold the knob 40 which might otherwise be pulled out of the coupler 10 by the drag force exerted by the flotage device 12.

It should be noted that the latch 41 has a hump 44 which normally extends through a slot 45 so as to protrude substantially above the exterior surface of the shield 34. In fact, the distance from the peak of the hump 44 to the exterior surface of the oppositely disposed portion of the shield 34 is greater than the internal diameter of the slide ring 32. Thus, the hump 44 is adapted to be struck by the slide ring 32 when it slides down the tow line 9 onto the coupler 10. Accordingly, the hump 44 is designed to perform the double functions of acting as a release trigger for the tow line 9 and also serving as a locking detent for the bridle 14 in a manner that is explained hereinafter.

As a safety precaution for the purpose of retaining the slide ring 32 prior to the release of the tow line 9, the coupler 10 is provided with one or more safety latches 47 as is best shown in FIG. 14. These are of any suitable type, such as a barrel latch or a door latch. They are inserted into the coupler 10 at any convenient location, preferably on opposite sides of the jaws 36 and 37. Each latch 47 is mounted in a cylindrical casing 48 containing a coiled spring 49 which is adapted normally to force the latch 47 outward. The latches 47 each have a slanting approach edge and a straight exit edge.

Accordingly, when the slide ring 32 travels, as is more fully described hereinafter, over the shield 34 of the coupler 10, it will strike the slanting edges of the latches 47 and will force them inside their casings 48. As soon as the slide ring 32 passes over them, the latches 47 will return to their normal positions and their straight exit edges will now prevent the slide ring 32 from slipping off the coupler 10 before the tow line 9 has been detached therefrom. The slide ring 32 will then travel onward toward the left to operate the latch 41 in a manner that is discussed hereinafter.

The method for launching a repeater 7 will now be described. At a suitable point in time well in advance of the time for overboarding a repeater 7, an empty flotage bag 15 is taken out of stowage and is placed on the deck 5 near the bag chute 19. The required amount of diesel fuel is then forced through the valve 16 into the bag 15. While the bag is being filled, it is connected by a shock line 11 to a coupler 10. This can be done in any suitable manner, such as by splicing the ends of the line 11, or by looping its ends and securing them with clips, or by using ring clips similar to the ring clip 30. Also, at this same time, a slide ring 32 is placed on the tow line 9 by passing the end connector 39 through the center of the slide ring 32. If desired, this could be accomplished instead by making the slide ring 32 in the form of a ring clip somewhat similar to the ring clip 30. After being placed on the tow line 9, the slide ring 32 is kept on the deck 5 so that it can be subsequently attached to a bridle 14.

Next, the latch 41 of the coupler 10 is moved to the left about its pivot to unlock the upper jaw 37 so that its right end can be pushed up through a slot 46 in the shield 34, as is indicated in FIG. 13, to enable the knob 40 of the connector 39 to be inserted between the jaws 36 and 37 of the coupler 10. After this has been done, the latch 41 and the movable jaw 37 are returned to their positions shown in FIG. 12. The jaws 36 and 37 now function to clamp and retain the connector 39. Thus, the flotage device 12 and the shock line 11 become detachably coupled to the tow line 9 by the coupler 10.

When the flotage bag 15 has been filled, it is overboarded by sliding it down the bag chute 19 into the water 13 where it is towed behind the ship 1 as is shown in FIG. 1. This launching of the flotage bag 15 is performed without slowing the ship 1 which maintains its normal cable-laying speed of eight knots. Since the shock line 11 is made of nylon, which has a low modulus of elasticity, it will function to reduce the force produced by accelerating the overboarded bag 15 to the speed of the ship 1 thereby minimizing the hazard of damage occurring to either the bag 15 or the tow line 9. The flotage bag 15 now functions in the manner of a sea-anchor to keep the tow line 9 taut in readiness for its operation as a trolley line during the launching of a repeater 7.

A bridle 14 is now caused to encircle the moving cable 2 by following the procedure described above for operating its detachable bottom plate 25. After this has been accomplished, the bridle 14 is placed in the trough 51 with its arm 53 held up by the supporting member 58 as is shown in FIG. 10. The bridle 14 is then connected to the tow line 9 by using the ring clip 30 to couple the corrosion link 29 to the slide ring 32 which was previously placed around the tow line 9 as was explained above. During this time, a repeater 7 is taken out of its stowage rack 50 and is placed in the approach trough leading to the cable-handling engine 4 as is described in the above-mentioned Kingston patent. When the adjacent portion of the cable 2 is fed through the engine 4, the repeater 7 will be drawn along the approach trough and will pass through the engine 4 in company with the cable 2. This situation is illustrated in FIG. 1.

After the repeater 7 emerges from the engine 4, it will slide along the exit trough 51 and will enter the bridle 14 as is represented in FIG. 10. The front end of the repeater 7 will now engage the downwardly extending portion 21 at the left end of the bridle 14 and will thereby pull the bridle 14 along the exit trough 51 in the direction indicated by the arrow in FIG. 10. This movement of the bridle 14 causes the outwardly extending portion of the arm 53 to be pulled off the supporting member 58 as is represented in FIG. 11.

Accordingly, the arm 53 is now permitted to drop down so that its downwardly extending portion 55 can engage the right end of the repeater 7 as is shown in FIG. 7. This action frees the bolt 57 so that its spring now pushes it forward across the upper surface of the arm 53 as is illustrated in FIG. 11 thereby locking the arm 53 in its present position. In turn, this serves to lock the repeater 7 securely within the bridle 14. Thus, the repeater 7 automatically engages the bridle 14 and is automatically locked therein without interrupting or reducing the continuity and speed of the cable-laying process.

Figure 2:
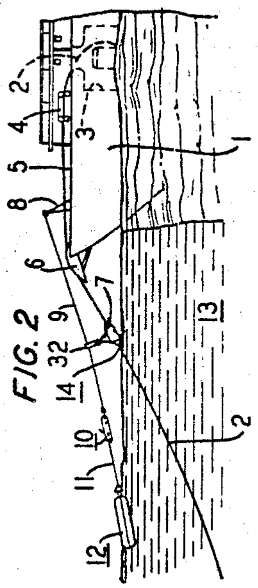
FIG. 2 is a pictorial representation of the stern of the cable-laying ship and illustrates an early stage in the process of overboarding a repeater from the ship and conveying it to the flotage device.
Figure 3:
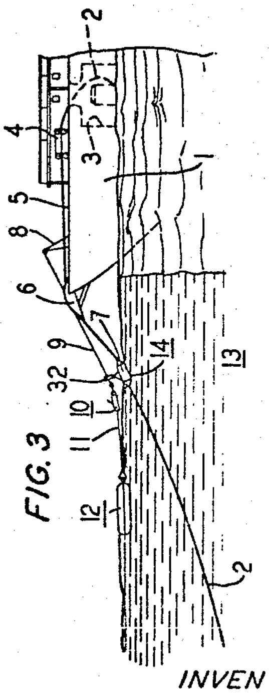
FIG. 3 is a similar pictorial representation of a further stage in the process of overboarding a repeater and shows the repeater at a point where it is approaching a coupling mechanism connected to the flotage device.

The movement of the cable 2 down the overboarding chute 6 subsequently causes the repeater 7 and its bridle 14 to slide down the chute 6 toward the water 13 so that the repeater 7 is launched at the normal cable pay-out speed. Since the slide ring 32 encircles the tow line 9, it serves to support the bridle 14 and its enclosed repeater 7 for sliding movement along the tow line 9 which now functions like a trolley line as is represented in FIG. 2. Thus, the slide ring 32 guides the bridle 14 and the repeater 7 to the coupling device 10 as is indicated in FIG. 3. Toward the end of this sliding movement, the slide ring 32 rides over the connector 39 and moves onto the shield 34 of the coupler 10 as is shown in FIG. 12. This action is facilitated by the fact that the trolley line 9 is made of steel which limits its curvature, particularly at its point of entry into the coupler 10.

Due to the fact that the slide ring 32 travels very rapidly down the trolley line 9 while supporting the repeater 7, which weighs about 400 pounds as was stated above, the slide ring 32 produces a considerable impact when it strikes the hump 44 of the latch 41. The force produced by this impact is sufficient to operate the latch 41 thereby triggering the release of the trolley line 9. In other words, the impact of the slide ring 32 forces the hump 44 down inside the slot 45 so as to permit the ring 32 to slide over it, as is represented in solid lines in FIG. 13, and to move onto the shock line 11 as is indicated in broken lines in FIG. 13.

At the time when the slide ring 32 is in the position shown in full lines in FIG. 13 wherein it is pressing down the hump 44, the latch 41 is turned to the left about its pivot thereby unlocking the upper jaw 37 by moving the tip 43 out of engagement therewith. The drag force that is being exerted by the flotage device 12 is in a direction extending to the left in FIG. 13 whereas the ship 1 is pulling the trolley line 9 toward the right. These opposing forces cause the knob 40 of the connector 39 to push the right end of the movable jaw 37 upward through the slot 46 in the shield 34, as is indicated in FIG. 13, thereby permitting the knob 40 to move out of the coupler 10.

The hump 44 of the latch 41 thus functions as a release trigger to effect the release of the gripping action of the jaws 36 and 37 upon the knob 40. This serves to detach the trolley line 9 from the coupler 10. After the trolley line 9 has been released, it is pulled back onto the deck 5 of the ship 1 for use with the next flotage device 12. It should be noted that, shortly before the latch 41 was actuated, the slide ring 32 travelled over the safety latches 47 which became operated in the manner described above for the purpose of preventing the slide ring 32 from slipping off the right end of the coupler 10.

By the time the knob 40 has been detached, the slide ring 32 will have moved past the slot 45. Accordingly, the movable jaw 37 and the latch 41 now return to their positions shown in FIG. 12 wherein the hump 44 abuts against the right end of the slot 45 and the left end of the jaw 37. The hump 44 remains in this position wherein it functions as a locking detent for holding and retaining the slide ring 32. Thus, the bridle 14 and the repeater 7 become coupled to the flotage device 12.

Figure 4:
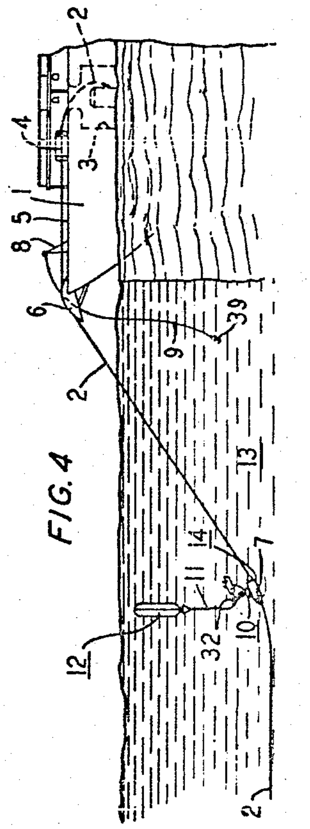
FIG. 4 is another similar pictorial representation and shows the final stage of the overboarding process in which the repeater has been connected to the flotage device and is sinking at the same rate of descent as the cable.

The repeater 7 and its associated equipment now sink slowly to the ocean floor at essentially the same rate of descent as the cable 2, as is represented in FIG. 4. This result is achieved by so designing the flotage device 12 that it will cause the combination of the repeater 7, bridle 14, coupler 10, flotage device 12, and shock line 11 to have approximately the same weight, when immersed in sea water, as the weight of a section of the cable 2 having the same length as the repeater 7. The result of this is that the descent of the repeater 7 does not alter the slack in the cable 2 and the repeater 7 suffers no shock when it reaches the ocean floor. Subsequently, the corrosion link 29 will disintegrate and will thereby uncouple the bridle 14 and the repeater 7 from the coupler 10, the shock line 11, and the flotage device 12.

What is claimed is:

1. Equipment for conveying a cable from a place of stowage on a ship into a body of water,
said equipment comprising an engine for controlling the movement of the cable while it is travelling overboard from its place of stowage into the water,
said cable having at least one lump connected therein which is heavy with respect to the cable,
said equipment being characterized by having conveying means for conveying said lump from the ship into the water,
a bridle adapted to encircle the moving cable,
means defining an opening in said bridle for adapting said bridle to admit said lump to the interior of the bridle, and coupling means for coupling said bridle to said conveying means for conveyance into the water together with a lump admitted therein.

2. Cable-laying equipment for conveying a cable from a place of stowage on a ship into a body of water,
said equipment comprising an engine for controlling the movement of the cable while it is travelling overboard from its place of stowage into the water,
said cable having at least one lump connected therein which is heavy with respect to the cable,
overboarding means for guiding the cable and said lump over the side of the ship into the water,
a trough for guiding the cable and said lump from the engine to said overboarding means,
said equipment being characterized by having guiding means for guiding said lump from the ship into the water,
a bridle adapted to encircle the travelling cable,
said bridle being positioned in said trough,
means defining an opening in said bridle for receiving said lump therein while the lump is travelling along the trough, and holding means for attaching said bridle to said guiding means for guidance into the water while containing a lump received therein.

3. Cable-laying equipment for overboarding a cable from a place of stowage on a ship into a body of water,
said equipment comprising means for controlling the movement of the cable while it is travelling overboard from its place of stowage into the water,
said cable having at least on lump connected therein which is appreciably thicker than the cable,
said equipment being characterized by having conveying means for conveying said lump from the ship into the water,
a bridle having a movable member for providing the cable with access to the interior of the bridle whereby the bridle is adapted to encircle the cable while the cable is moving,
said bridle having means defining an opening for admitting said lump into the interior of the bridle while the cable is travelling overboard,
means for retaining said lump inside said bridle after the lump has entered therein, and means including an annular member for connecting said bridle to said conveying means for conveyance into the water with a lump retained therein.

4. Equipment for conveying a cable from a place of stowage on a ship into a body of water,
said equipment comprising means for controlling the movement of the cable while it is travelling overboard from its place of stowage into the water,
said cable having at least one lump connected therein which is heavy with respect to the cable,
said equipment being characterized by having conveying means for conveying said lump from the ship into the water,
a bridle adapted to encircle the moving cable,
said bridle having means defining an opening adapted to admit said lump to the interior of the bridle while the lump is travelling with the cable,
means for locking said lump inside the bridle,
said last-mentioned means being adapted to be actuated by the movement of the cable and said lump, and connecting means for securing said bridle to said conveying means for conveyance into the water together with a lump locked inside it.

5. Equipment for conveying a cable from a place of stowage on a ship into a body of water,
said equipment comprising means for controlling the movement of the cable while it is travelling overboard from its place of stowage into the water,
said cable having at least one lump connected therein which is heavy with respect to the cable,
said equipment being characterized by having conveying means for conveying said lump from the ship into the water,
a bridle adapted to encircle the moving cable,
means defining an opening in said bridle for adapting said bridle to admit said lump to the interior of the bridle,
a trolley line extending overboard from the ship toward the water and disposed substantially parallel to the overboarded portion of the cable, said trolley line having one end secured to said ship and its other end anchored in the water,
and means for attaching said bridle to said trolley line for sliding movement down said anchored trolley line toward the water while containing said lump.

6. Equipment for conveying a cable from a place of stowage on a ship into a body of water,
said equipment comprising means for controlling the movement of the cable while it is travelling overboard from its place of stowage into the water,
said cable having at least one lump connected therein which is heavy with respect to the cable,
said equipment being characterized by having apparatus for conveying said lump from the ship into the water,
said apparatus including a bridle adapted to encircle the moving cable,
means defining an opening in said bridle adapted to admit said lump to the interior of the bridle,
a trolley line extending overboard from the ship toward the water,
a flotage device adapted normally to float on the surface of the water,
coupling means for coupling the flotage device to the trolley line,
and means for attaching said bridle to said trolley line for sliding movement down said trolley line toward the flotage device while containing said lump.

7. Equipment for conveying a cable from a place of stowage on a ship into a body of water,
said equipment comprising means for controlling the movement of the cable while it is travelling overboard from its place of stowage into the water,
said cable having at least one lump connected therein which is heavy with respect to the cable,
said equipment being characterized by having apparatus for conveying said lump from the ship into the water,
said apparatus including a bridle adapted to encircle the moving cable,
means defining an opening in said bridle adapted to admit said lump to the interior of the bridle,
a trolley line extending overboard from the ship toward the water,
a flotage device adapted to float on the surface of the water,
coupling means for coupling the flotage device to the trolley line,
supporting means for attaching said bridle to said trolley line for sliding movement down said trolley line toward the flotage device while containing said lump,
said supporting means being adapted to slide over said coupling means toward the flotage device,
and latching means included in said coupling means for preventing the supporting means from sliding in a reverse direction off said coupling means.

8. Equipment for conveying a cable from a place of stowage on a ship into a body of water, said equipment comprising means for controlling the movement of the cable while it is travelling overboard from its place of stowage into the water, said cable having at least one lump connected therein which is heavy with respect to the cable, said equipment being characterized by having apparatus for conveying said lump from the ship into the water, said apparatus including a bridle adapted to encircle the moving cable, means defining an opening in said bridle adapted to admit said lump to the interior of the bridle, a trolley line extending overboard from the ship toward the water, a flotage device adapted to float on the surface of the water, coupling means for detachably coupling the flotage device to the trolley line, supporting means for attaching said bridle to said trolley line for sliding movement down said trolley line toward the flotage device while containing said lump, said supporting means being adapted to slide over said coupling means toward the flotage device, and latching means included in said coupling means for detaching the trolley line from the coupling means, said latching means being actuated by the sliding of the supporting means thereover.

9. Equipment for conveying a cable from a place of stowage on a ship into a body of water, said equipment comprising means for controlling the movement of the cable while it is travelling overboard from its place of stowage into the water, said cable having at least one lump connected therein which is heavy with respect to the cable, said equipment being characterized by having apparatus for conveying said lump from the ship into the water, said apparatus including a bridle adapted to encircle the moving cable, said bridle having means defining an opening adapted to admit said lump to the interior of the bridle, means for locking said lump inside the bridle, a trolley line extending overboard from the ship toward the water, a flotage device adapted normally to float on the surface of the water, coupling means for detachably coupling the flotage device to the trolley line, supporting means for attaching the bridle to the trolley line for sliding movement down the trolley line to the flotage device while containing said lump, said supporting means being adapted for sliding over said coupling means toward the flotage device, said coupling means including latching means adapted to be actuated by the sliding of the supporting means thereover for detaching said trolley line from the coupling means while retaining the bridle together with the lump, and means for subsequently disconnecting the bridle with the lump from the coupling means and the flotage device.

10. Equipment for conveying a cable from a place of stowage on a ship into a body of water;

said equipment comprising means for controlling the movement of the cable while it is travelling overboard from its place of stowage into the water;

said cable having at least one lump connected therein which is heavy with respect to the cable;

said equipment being characterized by having apparatus for conveying said lump from the ship to the bottom of the body of water at substantially the same rate of descent as an equivalent length of the cable;

said apparatus including a bridle adapted to encircle the moving cable;

means defining an opening in said bridle adapted to admit said lump to the interior of the bridle;

a trolley line extending overboard from the ship toward the water;

a flotage device adapted normally to float on the surface of the water;

coupling means for detachably coupling an end of the trolley line thereto;

a shock line having one end fastened to the flotage device and its other end fastened to the coupling means;

said bridle being adapted for sliding movement down said trolley line toward the flotage device while containing said lump;

and latching means included in said coupling means and responsive to the sliding movement of the bridle for detaching the trolley line from the coupling means while retaining the bridle together with said lump;

said flotage device having a buoyancy equal to the sum of the weights of the lump, the bridle, the coupling means, the flotage device, and the shock line minus the weight of a section of the cable having the same length as the lump, all of said weights being the weights of the respective objects when immersed in the water.

11. Equipment for conveying an object from a ship to a body of water, said equipment comprising a flotage device adapted to float on the surface of the water for serving as a buoyant counterpoise for said object, a line having two ends, one of said ends being adapted to be secured to the ship, coupling means attached to said flotage device for detachably coupling the other end of said line to said flotage device, a bridle adapted to hold said object, supporting means for supporting said bridle and said object for sliding movement along said line in a direction extending from the ship to the flotage device, said supporting means being adapted during said sliding movement to produce an impact against said coupling means, and latching means included in said coupling means and operatively responsive to said impact for holding and retaining said supporting means together with said bridle and said object while detaching said other end of said line from said flotage device.

12. The method of conveying a lump from a ship to the bottom of a body of water at substantially the same rate of descent as an equivalent length of a cable to which it is connected, said lump being heavy with respect to said cable, said method comprising enclosing said lump in a bridle with said cable extending therefrom, placing afloat upon the surface of said body of water a flotage device for serving as a buoyant counterpoise for said lump and said bridle, attaching said bridle to a trolley line having one end secured to said ship and its other end detachably connected to said flotage device, sliding said bridle with said lump and said cable down said trolley line toward the flotage device, connecting said flotage device to said bridle together with said lump and said cable, and disconnecting said trolley line from said flotage device.

13. The method of conveying a lump from the deck of a ship to a body of water at substantially the same rate of descent as a cable to which it is connected, said lump being heavy with respect to said cable, said method comprising placing afloat upon the surface of said body of water a buoyant counterpoise for said lump, enclosing said lump in a bridle with said cable extending therefrom, attaching said bridle to a trolley line having one end secured to said ship and its other end detachably connected to said counterpoise, sliding said bridle with said lump and said cable down said trolley line toward said counterpoise, connecting said bridle and said lump to said counterpoise, disconnecting said trolley line from said counterpoise, and subsequently disconnecting said counterpoise from said bridle and said lump.

References Cited in the file of this patent

UNITED STATES PATENTS

| | | |
|---|---|---|
| 1,703,777 | Pernot | Feb. 26, 1929 |
| 2,981,454 | Dickinson et al. | Apr. 25, 1961 |

FOREIGN PATENTS

| | | |
|---|---|---|
| 748,227 | Great Britain | Apr. 25, 1956 |